No. 847,784. PATENTED MAR. 19, 1907.
R. P. KING.
MACHINE DRIVING MECHANISM.
APPLICATION FILED AUG. 30, 1906.
2 SHEETS—SHEET 1.
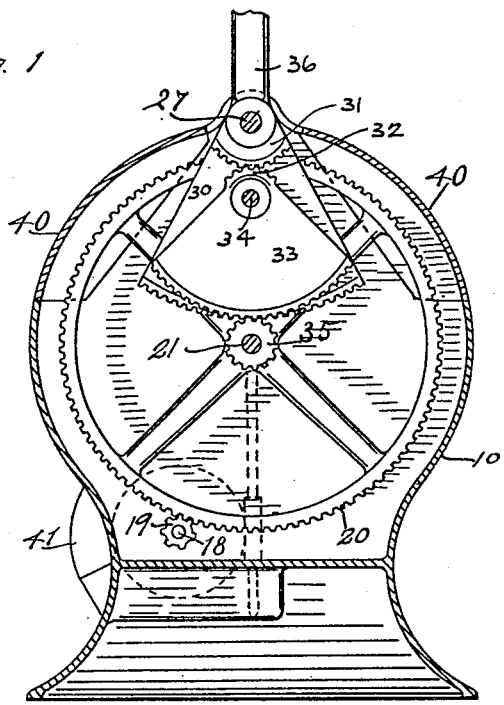
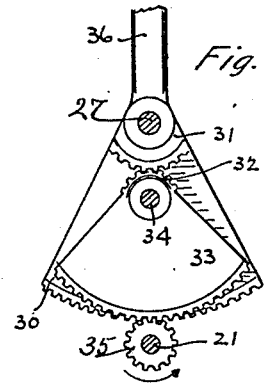
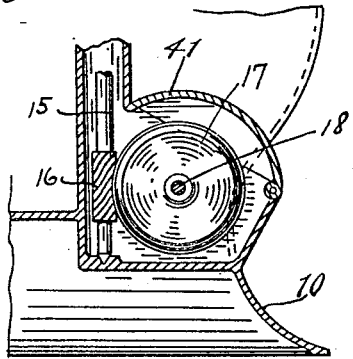
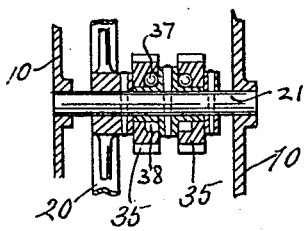
WITNESSES:
N. Allemong.
W. M. Gentle.
INVENTOR.
Robert P. King.
BY
V. H. Lockwood
ATTORNEY.

No. 847,784. PATENTED MAR. 19, 1907.
R. P. KING.
MACHINE DRIVING MECHANISM.
APPLICATION FILED AUG. 30, 1906.
2 SHEETS—SHEET 2.
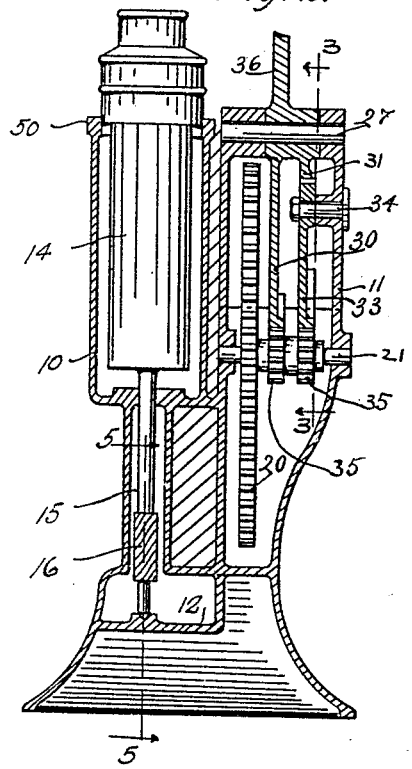
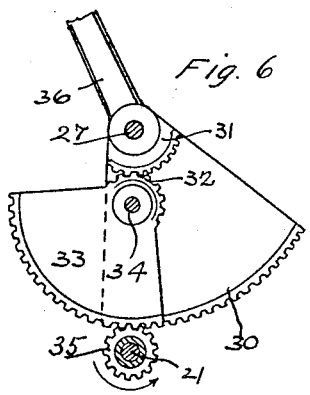
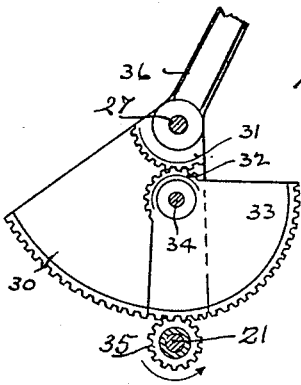
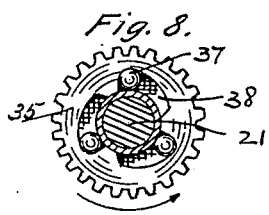
WITNESSES:
N. Allemong
W. M. Gentle
INVENTOR.
Robert P. King.
BY
V. H. Lockwood
ATTORNEY.

UNITED STATES PATENT OFFICE.

ROBERT P. KING, OF INDIANAPOLIS, INDIANA, ASSIGNOR, BY MESNE ASSIGNMENTS, TO THE CHAMPION LEVER MACHINE COMPANY, OF INDIANAPOLIS, INDIANA, A CORPORATION OF INDIANA.

MACHINE-DRIVING MECHANISM.

No. 847,784.  Specification of Letters Patent.  Patented March 19, 1907.

Application filed August 30, 1906. Serial No. 332,591.

*To all whom it may concern:*

Be it known that I, ROBERT P. KING, of Indianapolis, county of Marion, and State of Indiana, have invented a certain new and useful Machine-Driving Mechanism; and I do hereby declare that the following is a full, clear, and exact description thereof, reference being had to the accompanying drawings, in which like letters refer to like parts.

This invention relates to improvements in the mechanism disclosed in the pending application of Harrison Ogborn, filed August 4, 1906, Serial No. 329,172.

As stated in said application, the object of this invention is to provide a simple, economical, and efficient means, preferably hand-actuated, for driving machines. I have shown it herein for driving a cream-separator as I have used it for that purpose; but I do not wish to be limited to the use of the invention with any particular device.

The nature of the invention will be understood from the accompanying drawings and the following description and claim.

In the drawings, Figure 1 is a side elevation of the device with the side of the casing cut away and the hand-lever partly broken away. Fig. 2 is a central vertical section through the device. Fig. 3 is a section on the line 3 3 of Fig. 2. Fig. 4 is a section longitudinally through the driven shaft and the associated parts, parts being broken away. Fig. 5 is a section on the line 5 5 of Fig. 2. Figs. 6 and 7 are the same as Fig. 3, showing the parts in two extreme positions.

A frame 10, in the form of a casing, is provided and arranged to be secured in place—as, for illustration, secured to the floor. It has a removable side plate 11. A partition-casing 12 is secured in the main casing and also a plate 13. Above plate 13 a rotary cream-separator 14 is mounted within a support 50 and is rotated by a shaft 15, which carries a screw 16, driven by a worm-wheel 17 on the shaft 18. This latter shaft has a pinion 19, driven by a spur-gear 20 on the shaft 21, referred to herein as the driven shaft. My invention consists in improvements in the means for driving this shaft 21 regardless of what it operates, although the large gear 20 and the cream-separator 14 perform the function of a fly-wheel or momentum maintainer, but in themselves are not new.

In the top of the frame or main casing 10 a vertical hand-lever 36 is fulcrumed by a bolt 27. A toothed segment 30 is integral with and forms a continuation of the hand-lever, as seen in Fig. 1. There is also a small toothed segment 31, that extends down parallel with the segment 30 that is integral with the hand-lever 36. This small segment 31 engages a corresponding series of teeth 32 on the upper end of a toothed segment 33, that is fulcrumed on a pin 34, fastened in a casing-front 11. The toothed segment is so mounted that its periphery is parallel with the periphery of the segment 30. From this explanation and as shown in Figs. 6 and 7 it is obvious that when the segment 30 moves in one direction the segment 33 will be caused to move correspondingly in the opposite direction. These segments 30 and 33 engage pinions 34 and 35, respectively, that are loosely mounted on a driven shaft 21. They are clutched with said shaft by balls 37, as seen in Fig. 8, that operate in recesses 38 inside of the pinions with their outer walls inclined with reference to the shaft so that when said pinions are operated in one direction they will be clutched with the shaft by the balls, and when reversed will run idle. The two pinions are arranged so that they will clutch while rotating in the same direction and cause a continuous forward rotation of the shaft, although said pins will be alternately clutched with the shaft. By looking at Figs. 6 and 7 it will be observed that one or the other of the segments 30 and 33 during the oscillation of the lever 36 will be moving at all times to the left, and, therefore, one or the other of the pinions 34 and 35 will be always rotating in the direction of the arrow, whereby constant forward rotation of the shaft is obtained.

The advantages of the ball-clutch mechanism in this construction are the absence of the noise caused by ratchets and the like and the instant clutching engagement of the balls and the adaptability of the clutch to its work as the parts thereof wear. The advantage of the peripherally-toothed connection between parts 31 and 33 is that there is closer locking engagement between said parts at all times equidistant from the two fulcrums 27 and 34 and said toothed connection permits a wide throw of the lever 36. The weight of the lever and the hand upon the lever tends to bear down upon the segment 30 and bring about a closer engagement at all times of the teeth on the segment with the teeth on the pinion 34. Likewise the gravity of the lever 36 and the hand operating it causes a closer engagement of the teeth on the segment 31 with the teeth on the segment 33 and also of the lower teeth on the segment 33 with the pinion 35. This tendency to maintain a close engagement of said teeth tends to prevent the slipping of the teeth while the parts are under strain or after wear. The casing of the device herein is integral and closed excepting that the same is provided at the top with lids 40, that may be opened to make the interior of the mechanism accessible, and the lid 41, that closes the casing about the worm-wheel 17, as shown in Figs. 1 and 5.

What I claim as my invention, and desire to secure by Letters Patent, is—

A machine-driving mechanism of the kind described including the combination with a driven shaft, a pair of pinions loosely mounted thereon, and similarly-acting clutches for clutching said pinions on said shaft, a lever fulcrumed between its ends, a toothed segment secured to one end of said lever and engaging one of said pinions, and a toothed segment fulcrumed independently of said lever adapted to engage the other pinion, said lever having a series of teeth adapted to engage a series of teeth connected with the independently-mounted toothed segment, said series of teeth being curved concentrically with the fulcrums on the parts with which they are respectively connected.

In witness whereof I have hereunto affixed my signature in the presence of the witnesses herein named.

ROBERT P. KING.

Witnesses:
V. H. LOCKWOOD,
N. ALLEMONG.